Sept. 17, 1940.  H. W. CHEESEMAN  2,215,419
GAS REGULATOR
Filed March 20, 1936
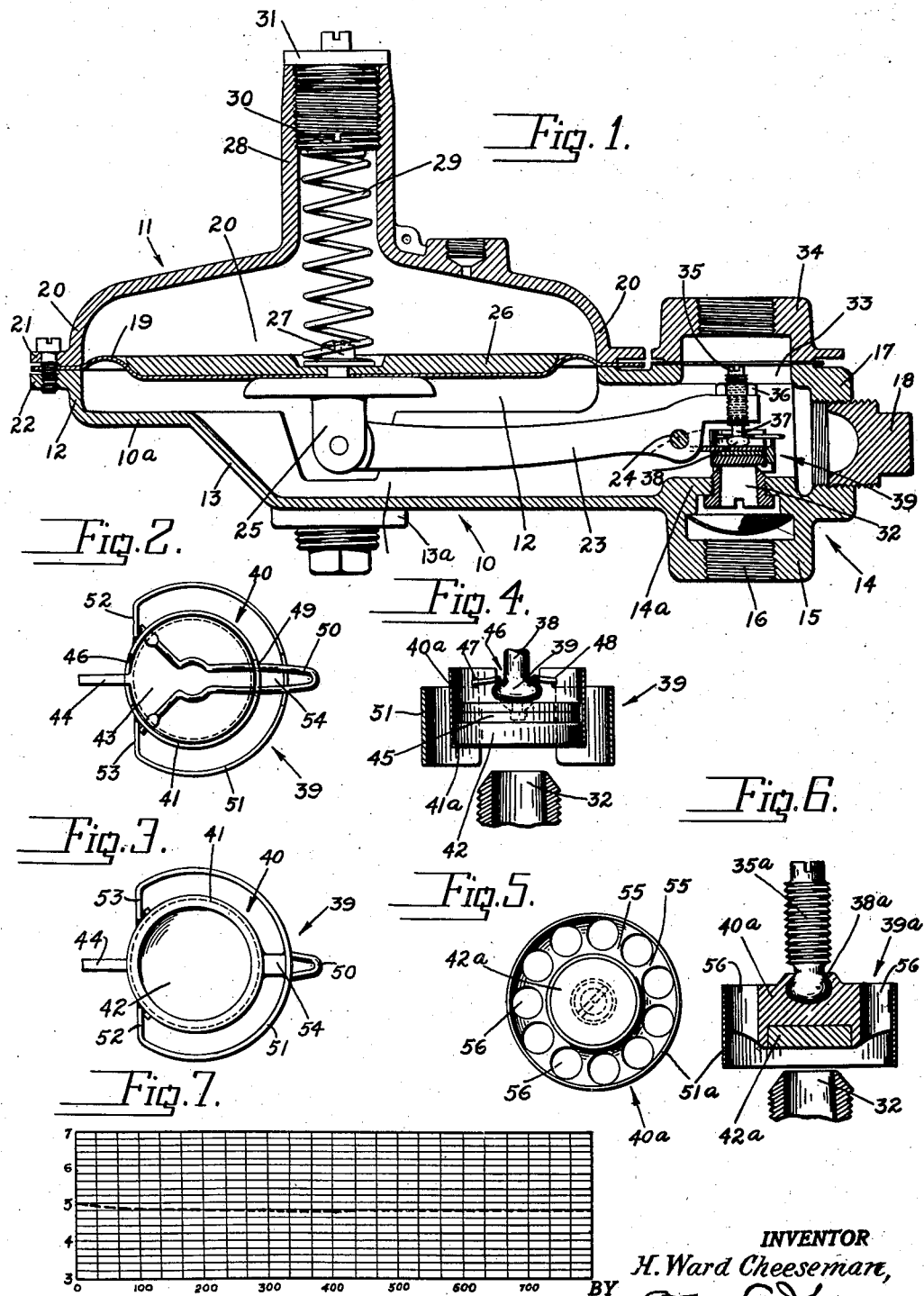
INVENTOR
H. Ward Cheeseman,
BY
ATTORNEY Sept. 17, 1940.  H. W. CHEESEMAN  2,215,419
GAS REGULATOR
Filed March 20, 1936
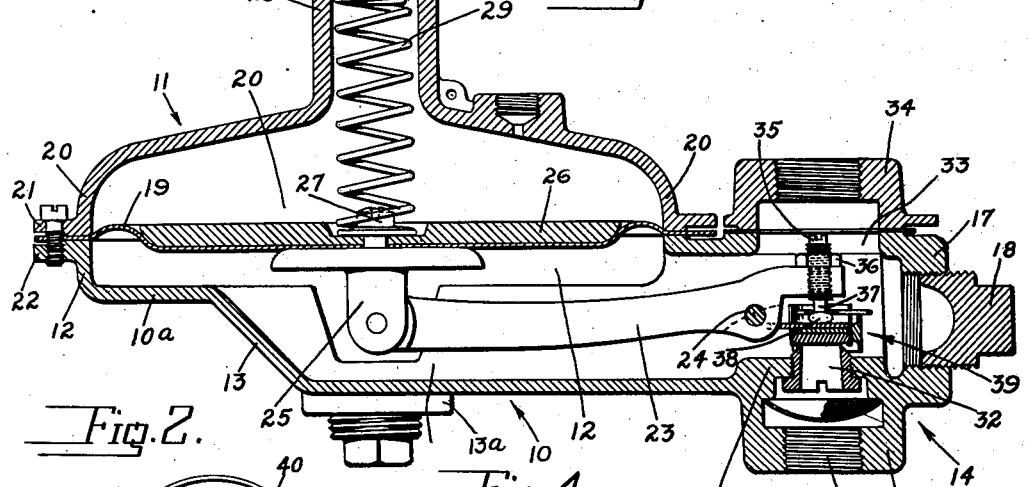
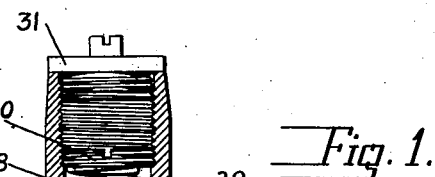
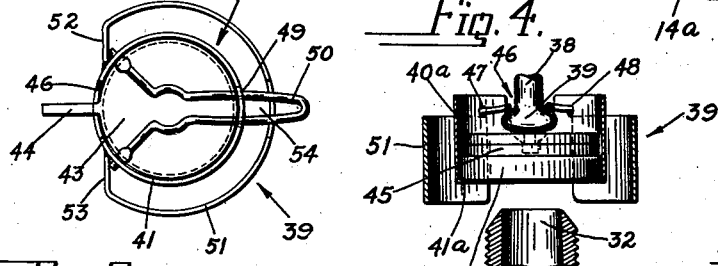
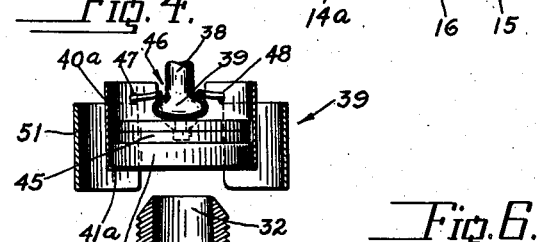
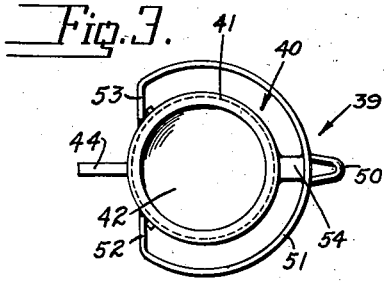
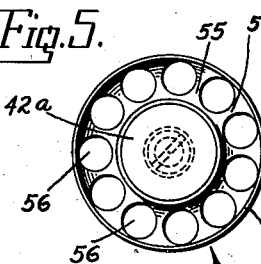
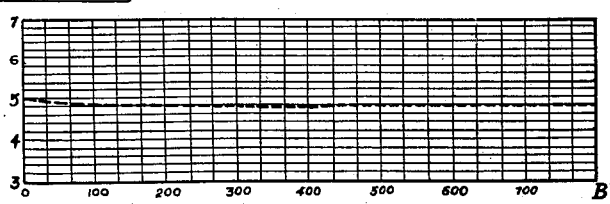
INVENTOR
H. Ward Cheeseman,
BY
ATTORNEY Patented Sept. 17, 1940

2,215,419

UNITED STATES PATENT OFFICE 2,215,419

GAS REGULATOR

Henry Ward Cheeseman, Bridgeport, Conn., assignor to Sprague Meter Company, Bridgeport, Conn., a corporation of Connecticut Application March 20, 1936, Serial No. 69,816

25 Claims. (Cl. 50—26)

This invention relates to gas regulators, and more particularly, to means for maintaining the regulated gas pressure substantially constant, even though the rate of flow and the velocity of the gas varies over a wide range.

The function of such regulators has always been to prevent the pressure of the gas in the outlet line from falling too low when the consumption of the gas increases. But, regulators as heretofore constructed could not hold the pressure variations within narrow bounds when there were wide variations in the rate of flow or the velocity of the gas. In one prior proposal, the excess falling off of pressure was avoided by controlling the flow of gas through the regulator so that the pressure increased substantially above the predetermined normal as the consumption increased. This, while a means to an end, is not usually desirable, and, with regulators so arranged, the pressure is not maintained within narrow limits.

According to the present invention, neither increase nor substantial decrease in the outlet pressure accompanies changes in the rate of flow or velocity of the gas, starting from no flow at all to the maximum for which the regulator is designed.

This is accomplished by positively controlling the flow of gas through the regulator between the inlet and outlet orifices of the regulator. For this purpose, the regulator valve, which is located between the substantially coaxial inlet and outlet orifices of the regulator, is provided with a gas-guiding tube or skirt encircling the valve, or partially so, and extending on the one end below the valve seat so as to overlap the inlet nozzle when the valve is almost closed, and on the other end above the valve seat to a point spaced from the outlet orifices of the regulator.

With the gas-guiding skirt surrounding the valve so as to project below the valve seat, it has been found by actual experience that the edges of the valve about which the gas stream turns from the plane of the seat upwardly toward the outlet opening need not have any special shape, and it has been found that the space between the valve and the skirt carried thereby may be quite open and unobstructed, or may be constituted by a series of channels so that the gas passes upwardly in a plurality of smaller streams.

Other features and advantages will hereinafter appear.

In the drawing:

Figure 1 is a vertical longitudinal section of a pressure regulator embodying the present invention.

Fig. 2 is a top plan view of an improved valve illustrating one embodiment of the present invention.

Fig. 3 is a bottom plan view of the valve of Fig. 2.

Fig. 4 is a vertical transverse section of the valve of Fig. 2, and the upper part of an orifice of a regulator.

Fig. 5 is a bottom plan view of a valve illustrating another embodiment of the present invention.

Fig. 6 is a vertical transverse section of the valve of Fig. 5 and the upper part of an orifice of a regulator.

Fig. 7 is a graph showing the variation in outlet pressure over a representative range of values of gas flow, using a valve of the present invention.

Referring to Fig. 1, there is shown a form of pressure regulator embodying the present invention, which includes a lower casing 10, made of cast metal, and providing a pressure chamber for the gas flowing through the regulator, and a dome 11 for housing a diaphragm. The casing 10 has a dish-shaped portion having a bottom 10a and side walls 12, and in the bottom 10a there is provided a radial trough with deep walls 13, the trough opening into a tail piece 14 which latter has in its bottom 14a a boss 15 apertured at 16 and internally threaded to provide connection for a gas delivery pipe.

A mercury seal 13a is provided in the side of the casing 10, for the purpose of protecting the meter and other apparatus connected in the system, from excessive gas pressure or from improper functioning of the regulator.

The tail piece 14 also has at its end a boss 17 which is apertured and internally threaded to accommodate a heel plug 18, which is removable for valve replacement as hereinafter disclosed. The pressure chamber of the casing 10 is provided with a large circular opening at its top, over which is disposed a flexible diaphragm 19, so as to close over and seal said chamber, and yet be responsive to fluctuations in the pressure of the gas therein.

The diaphragm 19 is clamped between the top of the walls 12 and the upper casing or dome 11 which has walls 20 abutting the walls 12, and for the purpose of securing the dome 11 to the casing 10, the walls 20 and 12 are provided with external flanges 21 and 22 respectively, which are apertured at intervals and held together by suitable screws. A lever 23 is provided in the trough of the pressure chamber, and fulcrumed on a pin 24 set in the walls of said trough, for the purpose of linking the diaphragm 19 to a valve hereinafter described. The end of the lever 23 which is directly under the diaphragm 19 has a lever plate 25 pivotally mounted thereon for attachment to the diaphragm, and the upper face of said diaphragm has disposed thereon a cast metal weight plate 26 fastened through the diaphragm to the plate 25 by means of a screw 27, thereby securing the diaphragm between the two plates without danger of pressure leakage, and connecting the diaphragm to the lever 23. Fluctuations of the diaphragm due to changes in the pressure of the gas in the casing 10 will cause the lever 23 to move about the fulcrum pin 24 to control the flow of gas through the regulator. The dome 11 is provided with an upwardly extending tubular boss 28 having its upper portion internally threaded, said boss forming a chamber for a helical compression adjusting spring 29 bearing one end against the weight plate 26 and the other end against an adjusting screw 30 in said boss. A plug or cap 31 is provided to close the end of the boss 28 for keeping out moisture and dirt.

The bottom 14a of the tail piece 14 is apertured and internally threaded to receive a valve orifice 32 through which the incoming gas flows, and which provides a seat for the novel valve structure of the present invention. The top of the tail piece 14 directly opposite the orifice 32 is provided with an aperture 33 furnishing an outlet for the gas stream, and there is attached over the top of the aperture 33 by suitable screws an internally threaded nipple 34 to receive the service pipe leading from the regulator.

Thus it will be seen that the incoming gas enters through the boss 15 of the tail piece and leaves through the boss 34 attached to the tail piece, and that the flow of gas through the regulator causes a pressure in the pressure chamber, to which pressure the diaphragm 19 is responsive. It will be noted, also, that the short end of the lever 23 is disposed directly in the path of the gas flowing from the orifice through the regulator, for the purpose of supporting a valve structure now to be described.

According to the present invention, there is provided a unique and novel form of valve proper for directing and controlling the gas entering through the orifice 32 so that said gas will be caused to flow in a directed and well defined stream out through the boss 34 in such manner as to create by a Venturi action a diminution of pressure within the casing 10 as the flow of gas increases through the regulator.

For the support of this valve, the short end of the lever 23 is apertured and internally threaded to receive a supporting screw 35 carrying a nut 36 for the purpose of locking the screw in adjusted position, and the lower end of said screw has an elongated neck 37 terminating in a bulbous end 38 as seen in Figs. 1 and 4.

Attached to the screws 35 is a unique type of valve proper 39, which is shown per se in Figs. 2, 3, and 4. The valve proper 39 includes a body 40 preferably formed of a cylindrical metal shell 41 having an internal flange 41a at its lower end which holds a disk 42 of suitable material for engaging the seat of the orifice 32. Within the shell 41 and above the disk 42 there is provided a metal plate 43 having an outwardly extending finger 44, and between the plate 43 and the disk 42 there is disposed a washer 45 for spacing purposes. The finger 44 of the plate 43 extends through a small notch in the bottom of a wide longitudinal slot 46 in the upper part of the shell 41, and is adapted to fit into a slot in the lever 23 so as to prevent turning of the valve proper relative to said lever. The shell 41 is provided with apertures 47, 48 and 49 in its upper portions to support a snap spring 50 which is shaped to receive and hold in snap engagement the neck and bulbous end of the valve supporting screw 35, and by the provision of this mounting means, it is possible to remove the valve proper from the supporting screw by a sidewise pull exerted on said spring. Thus the valve proper may be attached to, or removed from the end of the lever 23 through the opening in the boss 17 of the tail piece by means of a pair of pliers.

There is provided, by the at present preferred embodiment of the invention shown in Figs. 2, 3 and 4, and for the purpose of guiding and directing the flow of gas which strikes the face 42 of the valve proper, a metal tube or skirt 51 encircling the shell 41, spaced therefrom and extending substantially below the flanged end of said shell. The skirt 51 is partially cylindrical in form, and has its ends 52 and 53 turned inwardly and attached to the shell 41 so that said skirt is uniformly spaced therefrom. The skirt 51 is further supported on the shell 41 by means of a strut member 54 therebetween. Referring to Fig. 4 it will be seen that a stream of gas passing through the orifice 32 and striking the face of the disk 42 will flatten out until it meets the skirt 51, where it will be caused to flow upward between said skirt and the shell 41 in a partially tubular stream. This stream of gas will flow past the short end of the lever 23 substantially without interference therefrom and directly through the outlet nipple 34. In so doing, the stream of gas will, by a Venturi action, cause a condition of low pressure within the casing 10 and cause the diaphragm 19 to move downward and thereby open more fully, by means of a lever 23, the orifice 32. This allows more gas to flow through the regulator and effects by this action a compensation whereby the pressure of gas flowing from the regulator is maintained at a substantially constant value throughout the entire working range of the regulator and meter associated therewith.

An important feature of the valve mounting means shown in Figs. 1 to 4 is the provision for limited universal movement of the valve relatively to the lever. It will be noted that the bulbous end 39 of the screw 35 is substantially egg-shaped, with a relatively flat end disposed against the plate 43 and with the spring 50 pressing against the relatively flat underside of the end. This arrangement provides substantially a pressure fit socket for the bulbous end 39, and permits only limited universal movement of the valve about said end. In view of the fact that the skirt 51 directs the stream of gas through the outlet nipple 34, the position of the valve proper 39 relatively to said outlet is important, and if anything but a limited movement of the valve proper relatively to said outlet were permitted, the operation of the gas regulator would be seriously impaired.

The results obtained using the embodiment shown in Figs. 1 to 4 inclusive of the improved valve proper of the present invention are graphically given in Fig. 7, which shows a variation of not more than 25 hundredths of an inch pressure in head of water over the range of gas consumption of from 0 to 800 cubic feet per hour. This variation of 25 hundredths of an inch in pressure over the normal working range of the regulator contrasts sharply with the variation of almost two inches in head of water manifested by a regulator not employing Venturi action as provided by the valve encircling skirt of the present invention. It will thus be seen that there has been effected by the present invention a vast improvement in gas regulators whereby there is maintained a virtually constant output pressure despite large variations in the flow of gas through the regulator.

The provision of a gas-guiding member or skirt which is attached to the valve or closure member of a gas regulator, as disclosed by the present invention, is particularly important when it is considered that the closure member and skirt are readily removable as a unit, and that various sizes and styles of these units may be quickly and readily incorporated without changes in the regulator. Thus, a valve and skirt unit having a characteristic which is particularly suitable for certain conditions may be readily incorporated in a regulator already installed which is subjected to said conditions. Furthermore, by carrying the gas-guiding skirt on the valve or closure member, it has been possible to obtain a virtually flat and non-rising performance curve throughout the working range of the regulator, since for high values of flow the lower edge of the skirt will be disposed substantially clear of the end of the inlet orifice, causing a control of the gas stream entering said orifice which results in a non-rising performance curve, which of course indicates that a substantially constant output pressure is maintained for conditions of large gas consumption.

The provision of the improved valve proper of the present invention in a regulator also serves another important purpose. In regulators which are not provided with a skirt encircling a valve body, there has occurred, frequently upon shut off of the gas in use, a large and sudden building-up of pressure in the diaphragm chamber and a resulting flow of gas past the mercury seal of the regulator due to a flattening out of the gas stream flowing through the orifice. In a regulator employing the present improved valve proper this condition does not exist because a shut off of gas consumption can not cause a rapid building-up of pressure in the diaphragm chamber, since the flattened gas stream is directed out of the outlet. Thus, there is only an exceedingly small and hardly perceptible build-up of pressure resulting from shut off of gas consumption, and the mercury seal of the regulator is not blown or otherwise effected.

It should be understood, of course, that the particular embodiment of valve proper of the present invention shown in Figs. 1 to 4 is merely for illustrative purposes, and that any other suitable type of valve body and seat-engaging face may be employed with any other suitable type of gas-controlling and directing structure surrounding said body, without departing from the spirit of the invention.

A second embodiment of gas-controlling and guiding valve of the present invention is shown in Figs. 5 and 6, and includes a valve proper 39a machined from one piece of material, and having a body 40a recessed at its lower end to hold a seat-engaging disk 42a of suitable material, and having an outer skirt-portion 51a extending around the body, and below the lower end thereof, with supporting walls 55 between the body and the skirt, said walls being formed by drilling cylindrical chambers or gas passages 56 in the material between the skirt-portion 51a and the body 40a. The upper portion of the body 40a has a socket for receiving the bulbous end 38a of a supporting screw 35a, to support the valve on the end of the lever arm. The lower parts of the supporting portions 55 are cut away as shown in Fig. 6 to permit gas which strikes the disk 42a to flow more easily through the gas passages 56 without obstruction.

The operation of this second embodiment of the present invention in gas regulator is very similar to that of the embodiment shown in Figs. 1 to 4 inclusive. Gas flowing through the orifice 32 strikes the face of the disk 42a and is deflected so as to strike the lower portion of the skirt 51a, whereupon it flows upward through the gas passages 56 and passes directly into the outlet boss 34 in well defined streams. In so doing it creates, by a jet action a diminution of pressure in the pressure chamber of the regulator, causing the corresponding compensating action of the diaphragm thereof so as to permit more gas to flow through the regulator.

It should be understood that this compensation due to the jet action of the gas flowing out of the regulator is not dependent upon having the lower end of the skirt carried by the valve extend past the seat of the orifice in either embodiment. For conditions of large flow the face of the valve may be so far removed from the seat of the orifice that the lower end of the skirt carried by the valve will clear substantially said orifice seat. It is thus seen that gas striking the face of the valve proper will be caused to flow past the valve between the sides thereof and the skirt carried thereby by virtue of the relative shapes and disposition of these members, without particular reference to the proximity of the orifice.

By the provision of a guiding and gas directing skirt about the valve in the manner disclosed by the above embodiments of the present invention, gas which enters the regulator is made to flow in a directed stream into the outlet nipple 34 with substantially little interference after it strikes against the face of the valve proper. The gas which flows out through the nipple 34 thereby readily causes a partial vacuum in the area closed over by the nipple, due to Venturi action, resulting in a lesser pressure of gas in the casing 10 than if no such Venturi action existed. It should be understood that the present invention is not limited to any particular size of orifice valve or outlet nipple and various different sizes or combinations of sizes of these may be used, according to the type of regulation desired and according to the quantity of gas flow to be controlled.

The specific embodiments made the basis of exemplifying the present inventive concept are for illustrative purposes and not as limiting the invention in any way, for variations and modifications may be made within the scope of this invention and portions of the improvements may be used without others.

I claim:

1. A movable closure member for a gas regulator valve, including a body having a seat-engaging face and side walls, and also having means located therearound, movable therewith, and extending below the face thereof for guiding the gas stream striking said face and deflected thereby, so that it is turned and caused to flow in a predetermined stream past the side walls of the body in substantially its original direction through an axially aligned outlet.

2. A movable closure member for a gas regulator valve, including a body having a seat-engaging face and side walls, and also having means located therearound, movable therewith, and extending below the face thereof for guiding the gas stream striking said face and deflected thereby, so that it is turned and caused to flow in a predetermined stream past the side walls of the body in substantially its original direction through an axially aligned outlet; and a snap connection for attaching said body to a supporting member for relative movement and cooperating with the latter to restrain relative movement between the body and said member.

3. The invention as defined in claim 1, in which the body includes a tubular metal shell encircling a seat-engaging disk held in its end and extending at least to the upper end of the gas guiding means.

4. The invention as defined in claim 1, in which the body includes a tubular metal shell encircling a seat-engaging disk held in its end, and in which the means for guiding the gas includes a tubular metal member attached to the shell.

5. The invention as defined in claim 1, in which the means for guiding the gas includes a metal skirt extending substantially above the seat-engaging face of the body.

6. In a pressure regulator of the character described, the combination with a casing having an inlet for gas under pressure, said inlet having means forming a valve seat, and a gas outlet, of a closure member for controlling and directing the flow of gas through the casing, and disposed between the inlet and outlet and having a seat-engaging face disposed directly opposite to the valve seat and adapted to have the gas strike thereagainst and be deflected thereby, and said closure member also having means, carried thereby and located thereabout and extending below the face thereof, for guiding the deflected gas streams so that the gas will be caused to flow past the closure member in a predetermined stream and then to pass directly into the outlet with substantially no pressure loss and in such a manner as to create adjacent to the inner end of the outlet a jet action which increases in magnitude as the rate of flow of gas into the outlet increases and effects a corresponding diminution or decrease of pressure of gas in the casing, the outlet of the casing being in continuous axial alignment with the closure member and the valve seat so that the flow of gas would follow a continuous straight passage.

7. The invention as defined in claim 6, in which the closure member and means thereof for guiding gas is at most as wide as the gas outlet.

8. The invention as defined in claim 6, in which the means of the closure member for guiding gas is tubular in form, and is coaxially positioned with respect to the gas outlet.

9. The invention as defined in claim 6, in which the closure member is attached to the means connected with the pressure responsive means by a snap connection for limited movement of said closure member relative to said means.

10. The invention as defined in claim 6, in which the means of the closure member for guiding gas striking against the face thereof is clear of the valve seat during heavy flow of gas through the regulator, due to substantial movement of said closure member from the seat.

11. The invention as defined in claim 6, in which the means carried by the closure member for guiding the gas includes a tubular skirt, the inlet side of which is coaxially aligned with the valve seat.

12. The invention as defined in claim 6, in which the means carried by the closure member for guiding the gas includes a tubular skirt, the outlet side of which is coaxially aligned with the outlet.

13. The invention as defined in claim 6, in which the means carried by the closure member for guiding the gas includes a tubular skirt, the inlet side of which is coaxially aligned with the valve seat and the outlet side of which is coaxially aligned with the outlet.

14. The invention as defined in claim 6, in which the means carried by the closure member for guiding the gas includes a tubular skirt, the inlet side of which is coaxially aligned with the valve seat and the outlet side of which is coaxially aligned with the outlet, said tubular skirt being shaped so that its axis is straight.

15. In a pressure regulator of the character described, the combination with a casing having in one portion thereof means adapted to fluctuate in response to changes of pressure within the casing, and having in another portion thereof an inlet for gas under pressure having means forming a valve seat, and a gas outlet directly opposite to the inlet; means, connected to the pressure responsive means, and in movable relation to the valve seat; a closure member, supported by said means connected with the pressure responsive means, for controlling and directing the flow of gas through the casing, and disposed between the inlet and outlet and having a seat-engaging face disposed directly opposite to the valve seat and adapted to have the gas strike thereagainst and be deflected thereby, the said closure member also having means, carried thereby and located thereabout and extending below the face thereof, for guiding the deflected gas streams so that the gas will be caused to flow past the closure member in a predetermined stream and then to pass directly into the outlet with substantially no pressure loss and in such a manner as to create adjacent to the inner end of the outlet a jet action which increases in magnitude as the rate of flow of gas into the outlet increases and effects a corresponding diminution or decrease of pressure of the gas in the casing, acting on the pressure responsive means so as to maintain a virtually constant output pressure of gas despite variations in the flow thereof.

16. A gas regulator valve including a body having a seat-engaging face and side walls, and also having means located therearound and extending below the face thereof for guiding the gas stream striking said face and deflected thereby so that it is turned and caused to flow in a predetermined stream past the side walls of the body in a substantially continuous straight line toward an axially aligned outlet, said means including a structure spaced from the body and carried thereby.

17. In a pressure regulator of the character described, the combination with a casing having in one portion thereof a diaphragm adapted to fluctuate in response to changes in pressure within the casing, and having in another portion thereof an inlet for gas under pressure and a gas outlet directly opposite to the inlet, of means forming a valve seat around the inner end of the inlet, a valve proper for controlling and directing the flow of gas into the casing, disposed between the inlet and outlet and having a seat-engaging face disposed directly opposite to the valve seat and adapted to have the gas strike thereagainst, and also having a gas-guiding structure thereabout, spaced therefrom, and carried thereby so that one end of said structure extends beyond the face of the valve, whereby when the valve is open the gas, after striking against the face, is caused to flow in the space between the valve and the structure carried thereby and then to pass directly into the outlet with substantially no pressure loss and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphram to and from the valve seat in order to regulate or control the pressure of the gas flowing out of the casing via the outlet, fulcrumed centrally in the casing and having the valve connected to one end thereof and its other end connected to the diaphragm so that it operates to open the valve when the diaphragm moves in one direction as the result of a decrease in pressure within the casing.

18. In a pressure regulator of the character described, the combination with a casing having an inlet for gas under pressure said inlet having means forming a valve seat, and a gas outlet, of a closure member for controlling and directing the flow of gas through the casing, and disposed between the inlet and outlet and having a seat engaging face disposed directly opposite the valve seat and adapted to have the gas strike thereagainst and be deflected thereby, and said closure member also having means including a tubular skirt having an outlet, carried thereby and located thereabout and extending below the face thereof, for guiding the deflected gas streams so that the gas will be caused to flow past the closure member in a predetermined stream and then to pass directly into the outlet with substantially no pressure loss and in such a manner as to create adjacent to the inner end of the outlet a jet action which increases in magnitude as the rate of flow of gas into the outlet increases and effects a corresponding diminution or decrease of pressure of gas in the casing, the outlet of the casing being in continuous axial alignment with the outlet of said tubular skirt so that the flow of gas would follow a continuous straight passage.

19. In a pressure regulator of the character described, the combination with a casing having an inlet for gas under pressure said inlet having means forming a valve seat, and a gas outlet, of a closure member for controlling and directing the flow of gas through the casing, and disposed between the inlet and outlet and having a seat engaging face disposed directly opposite the valve seat and adapted to have the gas strike thereagainst and be deflected thereby, and said closure member also having means including a tubular skirt having an inlet and outlet, carried thereby and located thereabout and extending below the face thereof, for guiding the deflected gas streams so that the gas will be caused to flow past the closure member in a predetermined stream and then to pass directly into the outlet with substantially no pressure loss and in such a manner as to create adjacent to the inner end of the outlet a jet action which increases in magnitude as the rate of flow of gas into the outlet increases and effects a corresponding diminution or decrease of pressure of gas in the casing, the inlet of said tubular skirt being in continuous axial alignment with the valve seat and the outlet of the casing being in continuous axial alignment with the outlet of said tubular skirt so that the flow of gas will follow a continuous straight passage.

20. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing disposed between the inlet and the outlet and in spaced relation with respect to the interior surfaces of the casing and having a seat engaging face disposed directly opposite to the valve seat and adapted to have the gas strike thereagainst, a sleeve extending in spaced relation around and movable with the valve and arranged to cause the gas after striking against the seat engaging face of the valve to flow into the outlet in a concentrated stream and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having the valve operatively connected to one end thereof and its other end connected to the diaphragm so that it operates to open the valve when the diaphragm fluctuates in one direction as the result of a decrease in pressure within the casing.

21. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing disposed between the inlet and the outlet and in spaced relation with respect to the interior surfaces of the casing and having a seat engaging face disposed directly opposite to the valve seat and adapted to have the gas strike thereagainst, a sleeve having one end thereof extending in spaced relation around and connected to the valve and its other end terminating adjacent to, but spaced inwardly from, the outlet, and adapted to cause the gas after striking against the seat engaging face of the valve to flow into the outlet in a concentrated stream and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having the valve operatively connected to one end thereof and its other end connected to the diaphragm so that it operates to open the valve when the diaphragm fluctuates in one direction as the result of a decrease in pressure within the casing.

22. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of a tubular valve seat at the inner end of the inlet, a valve for controlling the flow of gas into the casing disposed between the inlet and the outlet and in spaced relation with respect to the interior surfaces of the casing and having a seat engaging face disposed directly opposite to the valve seat and adapted to have the gas strike thereagainst, a sleeve having one end thereof extending in spaced relation around and connected to the valve and projecting into encircling relation with the valve seat and its other end terminating adjacent to, but spaced inwardly from, the outlet, and arranged to cause the gas after striking against the seat engaging face of the valve to flow into the outlet in a concentrated stream and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having the valve operatively connected to one end thereof and its other end connected to the diaphragm so that it operates to open the valve when the diaphragm fluctuates in one direction as the result of a decrease in pressure within the asing.

23. A movable closure member for a gas regulator valve, including a body having a seat-engaging face and side walls, and also having means located therearound, movable therewith, and extending below the face thereof for guiding the gas stream striking said face and deflected thereby, so that it is turned and caused to flow in a predetermined stream past the side walls of the body in substantially its original direction; an actuating lever for said closure member; and a snap connection between said closure member and said actuating lever for attaching the closure member to the actuating lever for limited movement of said closure member relative to said actuating lever.

24. A movable closure member for a gas regulator valve including a body having a seat-engaging face and side walls; and means located therearound, movable therewith, and extending substantially above the face thereof for guiding the gas stream striking said face and deflected thereby, so that it is turned and caused to flow in a pretermined stream past the side walls of the body in substantially its original direction, said guiding means including longitudinally extending passages provided in the material of the body, the outer walls of said passages being continuous and forming a tube which extends below the face of the body.

25. A movable closure member for a gas regulator valve including a body having a seat-engaging face and side walls; and means located therearound, movable therewith, and extending substantially above the face thereof for guiding the gas stream striking said face and deflected thereby, so that it is turned and caused to flow in a predetermined stream past the side walls of the body in substantially its original direction, said guiding means including longitudinally extending cylindrical passages provided at spaced circumferential intervals in the material of the body, the outer walls of the passages being continuous and forming a tube which extends below the face of the body.

HENRY WARD CHEESEMAN.